Figure 1:
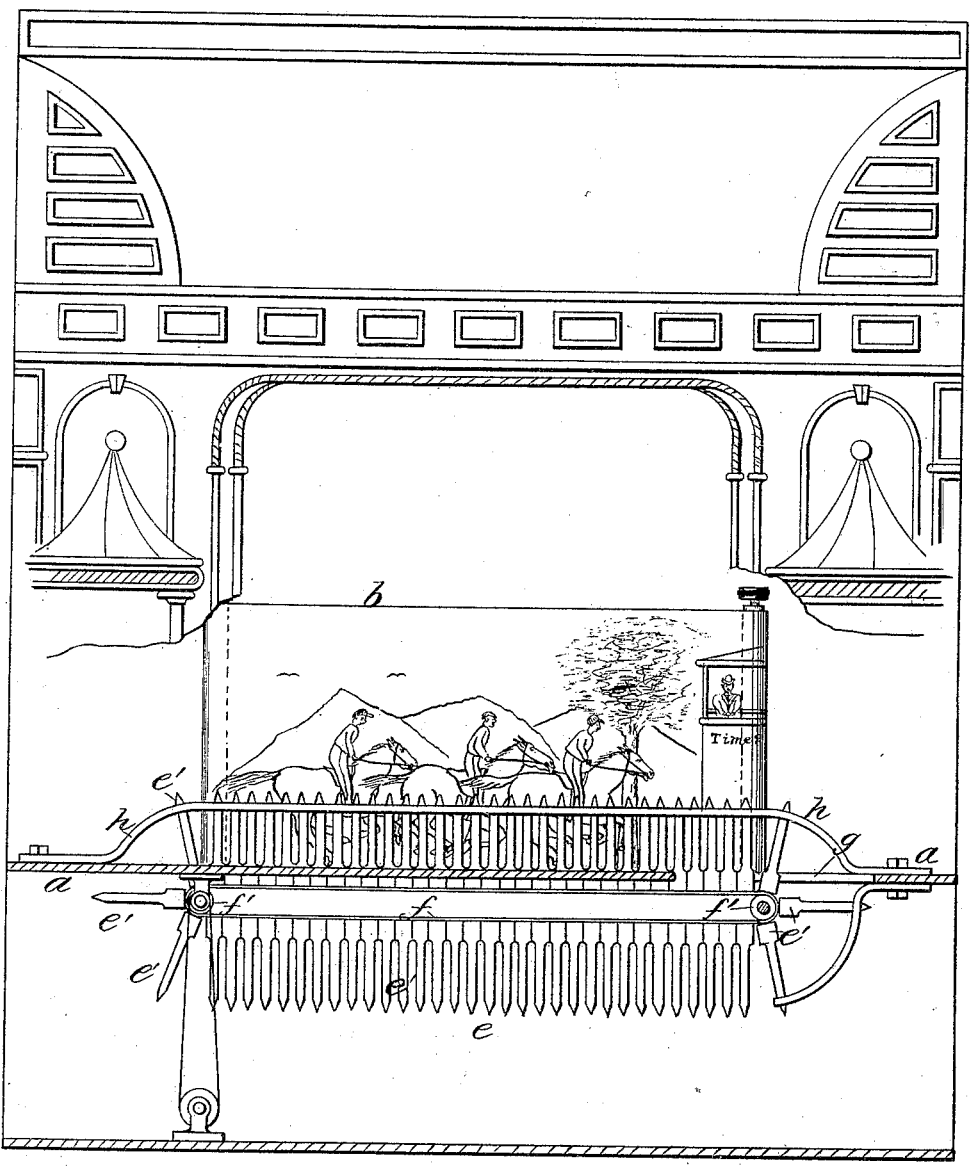

(No Model.) 2 Sheets—Sheet 1.

J. W. KNELL.
APPARATUS FOR PRODUCING ILLUSORY DRAMATIC EFFECTS.

No. 423,171. Patented Mar. 11, 1890.

Witnesses:
Harry R. Williams.
Arthur B. Jenkins.

Inventor,
James W. Knell
By Simonds & Burdett,
Attys (No Model.) 2 Sheets—Sheet 2.
J. W. KNELL.
APPARATUS FOR PRODUCING ILLUSORY DRAMATIC EFFECTS.
No. 423,171. Patented Mar. 11, 1890.
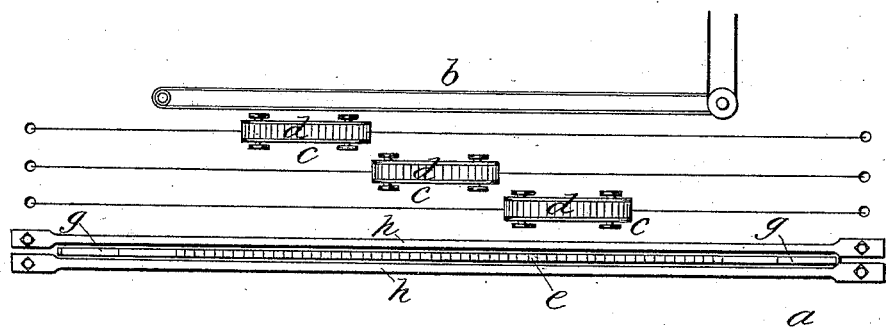
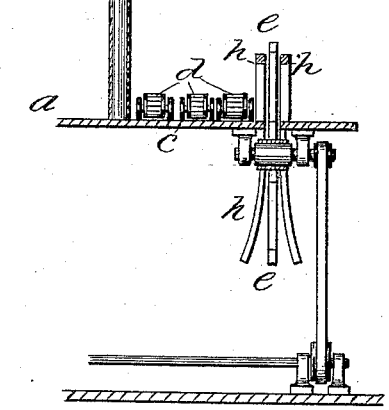
Witnesses:
Harry R. Williams
Arthur B. Jenkins
Inventor,
James W. Knell
By Simonds & Burdett,
attys

UNITED STATES PATENT OFFICE.

JAMES W. KNELL, OF HIGHLANDS, NEW JERSEY.

APPARATUS FOR PRODUCING ILLUSORY DRAMATIC EFFECTS.

SPECIFICATION forming part of Letters Patent No. 423,171, dated March 11, 1890.

Application filed December 5, 1889. Serial No. 332,657. (No model.)

*To all whom it may concern:*

Be it known that I, JAMES W. KNELL, of Highlands, in the county of Monmouth and State of New Jersey, have invented certain new and useful Improvements in Apparatus for Producing Illusory Dramatic Effects, of which the following is a full, clear, and exact description, whereby any one skilled in the art can make and use the same.

My within-described improvement relates to the class of stage apparatus in which certain mechanism is employed to enable the effect of races between moving objects to be simulated; and the object of my within-described improvements is to so combine certain mechanisms as to enable the appearance of rapid movement on the part of the object to be increased beyond that actually given to it.

My invention consists in the combination, with the stage, the scenery, and the device for supporting the moving object, of a fence, wall, or like device movably mounted in operative relation to the surroundings; and it further consists in details of the several parts of the devices and apparatus, and in their combination, as more particularly hereinafter described, and pointed out in the claims.

Referring to the drawings, Figure 1 is a view in front elevation of the stage set to display a racing scene, with part of the scenery at the wings broken away to show the stage-floor in vertical section and part of the apparatus in side view. Fig. 2 is a top or plan view of the stage in front of the background scene. Fig. 3 is a detail view in vertical cross-section of the stage and part of the apparatus.

In the accompanying drawings, the letter $a$ denotes a stage-floor; $b$, the background, that may be of any convenient arrangement of scenes, or formed of a combination of flats and wing-pieces or flies. The background $b$ may be a panoramic scene, and in depicting some races is preferably of that form. In case the object with relation to the movement of which the stage and scene is prepared is to be represented as engaged in a race, it is mounted, preferably, on an endless path $d$, that may be fixed with relation to the stage, as is the case in some apparatus described in my prior United States Patent No. 286,709, dated October 16, 1883; or it may be placed on an endless path borne on a carriage $c$. In any event, however, the path of movement of the object is across the stage more or less parallel to the front. In front of the path of movement of this object there is arranged a fence or wall $e$, preferably the former. The fence is made up of a series of slats or palings $e'$, that are each supported at the base on a belt $f$, the pickets being preferably arranged with broad bases, so that their edges are in contact, while the upper parts of the slats or pickets are narrower than the base part, showing the usual space between the slats or pickets where the latter project above the level of the stage-floor. An opening $g$, usually a long narrow one, is made through the stage-floor to allow the slats to be brought up into view from below the stage and move rapidly across it by the movement of the belt $f$, on which the slats are supported. The edges of this opening $g$ may form supports to guide the slats near their bottom ends, and guides $h$ extend along the stage over the opening, so that the slats rising through the floor pass between the guides and are held in a vertical position as long as they remain in view. The ends of the guides are preferably bent downward and secured to the stage, and they may extend below the stage in a V form, the apex turned upward so that the slats may be caused to certainly enter between the somewhat narrow opening between the guides $h$. The belt $f$, to which the slats or pickets are secured at their lower end, is made of a flexible material, as leather, canvas, or the like; or the slats may be linked together, so that their bottom edges, in combination with the links, form a chain. In any event the belt or its equivalent is supported on pulleys $f'$, that are mounted in hangers and provided with means for turning the pulleys at any desired rate of speed.

A single moving object may be placed upon the stage and caused to move at any desired rate of speed across it, while at the same time the fence $e$, or a series of panels forming a wall, may be caused to move in the opposite direction by driving the belt; or two or more objects or figures may be caused to so move in relation to each other that the illusory effect of a race between them is produced. The number of the moving objects, or the means or manner of their movement, is not material to my within-described invention, although some form of endless path as the immediate support of a moving figure is preferred.

I claim as my invention—

1. In combination with the stage, the scenery, and the device for supporting a moving object, the fence mounted on a movable belt or like flexible part supported in operative relation to the stage and scenery, all substantially as described.

2. In combination with a stage, the scenery, and the endless path for supporting the moving object, a fence made up of a number of slats or palings mounted upon a movable belt or like flexible connection, the movable belt supporting the pickets, and the guides arranged to hold the pickets in an upright position, all substantially as described.

3. In combination with a stage, the scenery, and an endless belt for supporting a moving object mounted thereon, a fence made up of a number of pickets secured to a flexible belt or like part with the edges of their bases in contact when in an upright position, the flexible belt bearing the fence and supported on pulleys, and means for rotating the pulleys, all substantially as described.

4. In combination with a stage, the scenery, and a device for supporting a moving object, an opening through the stage-floor, a fence arranged to pass through and along the opening and composed of a series of slats secured to a belt, the moving belt supported below the stage-floor, and the guides extending along the path of movement of the pickets above the level of the floor, all substantially as described.

JAMES W. KNELL.

Witnesses:
DAVID TOWERS,
H. B. GIBBONS.